United States Patent [19]

Tippen

[11] Patent Number: 4,598,783
[45] Date of Patent: Jul. 8, 1986

[54] TRACTION DEVICE FOR VEHICLES

[75] Inventor: Lesley T. Tippen, 118 Roxanna St., West Monroe, La. 71291

[73] Assignees: Lesley Jerry Tippen; Bettie Tippen Young, both of West Monroe; Sharon Tippen Schooley, Calhoun; Lisa Tippen Carter, West Monroe, all of La. ; part interest to each

[21] Appl. No.: 653,456

[22] Filed: Sep. 24, 1984

[51] Int. Cl.⁴ .............................................. B62D 55/02
[52] U.S. Cl. ................................. 180/9.32; 180/9.34; 180/9.38
[58] Field of Search ................ 180/9.26, 9.28, 9.3, 180/9.32, 9.34, 9.36, 9.38, 9, 9.1, 15, 16

[56] References Cited

U.S. PATENT DOCUMENTS

| | | | |
|---|---|---|---|
| 995,538 | 6/1911 | Heverling | 180/9.28 |
| 1,292,170 | 1/1919 | Wagner | 180/9.34 X |
| 2,105,042 | 1/1938 | Kegresse | 180/9.28 |
| 2,714,933 | 8/1955 | Harris | 180/9.28 |
| 2,917,120 | 12/1959 | Gates | 180/9.36 |
| 4,204,583 | 5/1980 | Toyoura | 180/9.28 |

FOREIGN PATENT DOCUMENTS

| | | | |
|---|---|---|---|
| 2811675 | 9/1979 | Fed. Rep. of Germany | 180/9.34 |
| 723925 | 1/1932 | France | 180/9.32 |

Primary Examiner—Robert G. Nilson
Attorney, Agent, or Firm—Laubscher & Laubscher

[57] ABSTRACT

A traction device for a vehicle which includes in a first embodiment, an endless belt mounted on a pair of rotating drums located beneath the vehicle and fitted with multiple angle plates for engaging the crown of the road when the ruts are of such depth as to cause the vehicle to lose traction. In another preferred embodiment, the endless belt is replaced by driven chains carrying the angle plates to achieve the desired auxiliary traction.

4 Claims, 10 Drawing Figures

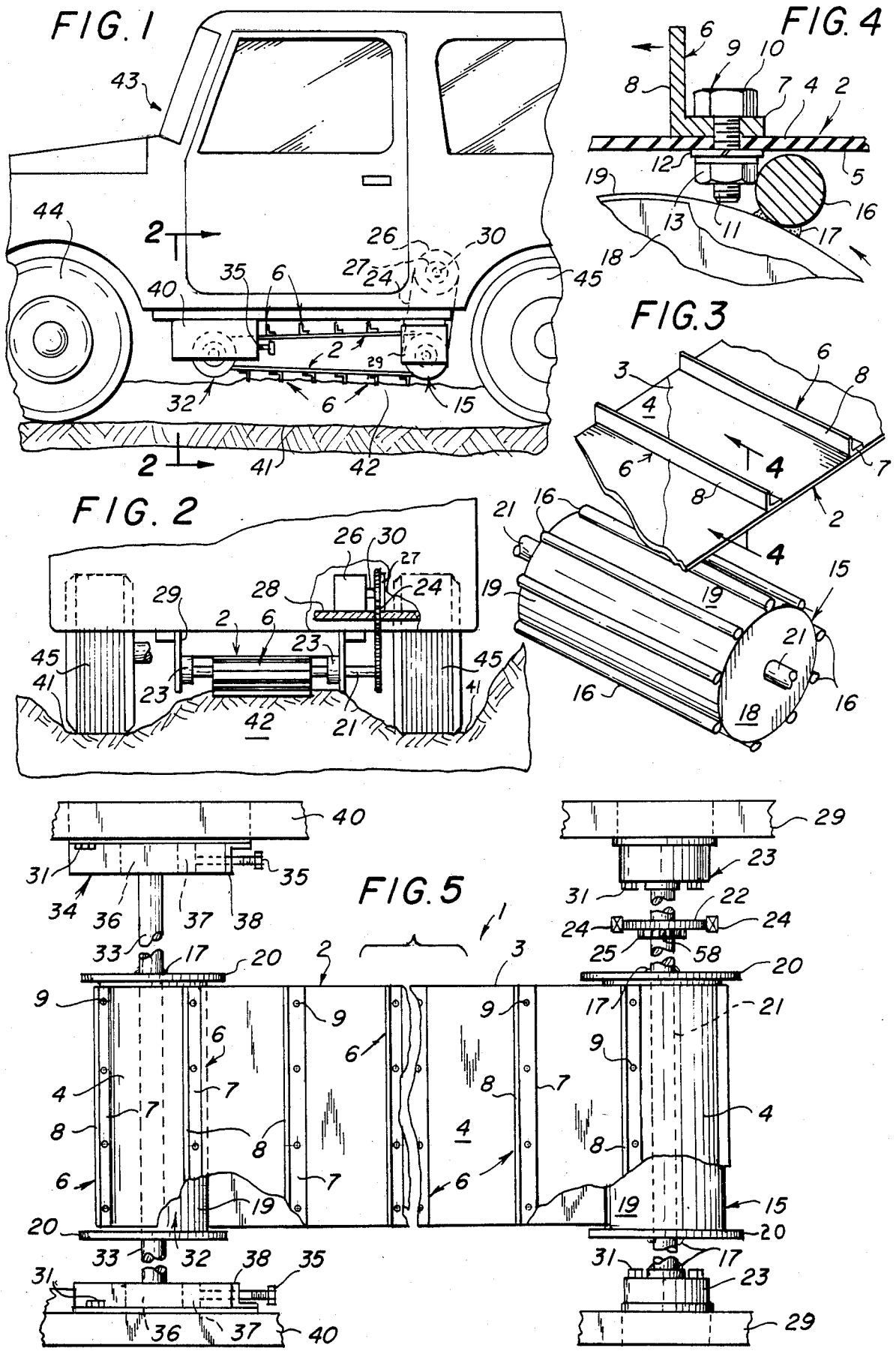

TRACTION DEVICE FOR VEHICLES

BACKGROUND OF THE INVENTION

1. Field of the Invention

This invention relates to auxiliary traction devices for vehicles and more particularly, to a traction device which is positioned beneath a vehicle and is designed to provide traction under circumstances where the vehicle wheels lose traction due to excessively deep ruts. In a first preferred embodiment the traction device is characterized by a rotating endless belt mounted on a pair of drums located between the front and rear wheels and provided with spaced angle iron or angle plate members which rotate with the belt and contact the crown of terrain traversed by the vehicle to provide auxiliary traction. In another preferred embodiment the traction device includes a parallel endless chain system carried by sprockets provided on rotating shafts and including transversly-mounted angle iron or angle plate segments bolted in spaced relationship to the chains. As the chains rotate, the angle plate or angle iron segments contact the crown of the terrain to achieve the desired traction.

The traction device for vehicles is an accessory for all vehicles which are operated in off-road situations, as well as on well maintained roads during emergency conditions such as mud slides, snow and ice and other conditions which render traction of the drive wheels of the vehicle difficult due to a "high center" condition of the vehicle. The traction device is useful when the vehicle is incapable of forward or reverse movement by conventional wheel action under circumstances where the vehicle wheels are in deep ruts and the frame of the vehicle is resting on the crown of the terrain which is being traversed. In such a high center situation the traction device can be implemented to provide the necessary traction to remove the vehicle from a mired or stuck condition. Accordingly, this invention relates to a device for providing auxiliary traction for a vehicle in a mired condition wherein the driven wheels of the vehicle have lost their tractive ability in deeply rutted or soft spots in any terrain.

2. Description of the Prior Art

Many different techniques have been developed in the prior art for removing a vehicle from a mired or stuck condition. For example, the powered wheels of vehicles have been used in the prior art as a source of motive power for such purposes. It is known, for example, to mount a winch drum on one of the driven rear wheels of a vehicle and to anchor one end of a cable wound on a winch drum to a solid object spaced from the vehicle, in order to remove the vehicle from a mired or immobile condition. An early winch for mounting on one of more of the driven wheels of a vehicle is disclosed in a "Draft Appliance for Automobiles" in U.S. Pat. No. 1,054,831, patented on Mar. 4, 1913, to G. V. DePeel. The apparatus of this invention includes a spool mounted to the hub of a driven rear wheel and threaded through a tension or friction guide carried by the bumper to a stake, tree or other immobile object. The wheel is then rotated by racing the engine to wind the rope on the spool and remove the vehicle from its immobilized position.

Other techniques for removing vehicles from mired or stuck conditions include the use of tractor and traction devices, many of which are driven by the powered wheels of the vehicle. U.S. Pat. No. 1,296,309, dated Mar. 4, 1919, to R. J. Netzel, entitled "Tractor Device for Motor Vehicles" is an early design of such a vehicle. The Netzel device includes a pair of caterpillar tractors mounted in spaced relationship on sprockets and driven by the wheels of the vehicle to increase vehicle traction. A "Motor Car" is disclosed in U.S. Pat. No. 1,355,953, dated Oct. 19, 1920, to Leopole Salvator Habsburg-Lothringen. This patent also discloses a pair of caterpillar treads mounted as outriggers between the front and rear wheels of the motor car and driven by the front wheels by means of chains and sprockets, to aid vehicle traction. U.S. Pat. No. 1,443,963, dated Feb. 6, 1923, to A. Monsen, discloses a "Selt-Propelled Vehicle", which also discloses a pair of caterpillar treads driven by sprockets in association with a power take-off from the vehicle engine, the caterpillar treads being adjustable for disposition in selective engagement with the ground. An "Endless Track Attachment for Trucks" is disclosed in U.S. Pat. No. 1,729,374, dated Sept. 24, 1929, to C. S. Ehrhart. The "Endless Track Attachment for Trucks" includes an endless track which serves as a booster for aiding traction. The endless track can be raised from and lowered to engage the ground and is driven by means of a chain drive from the transmission mechanism or differential drive of the vehicle. U.S. Pat. No. 2,105,042, dated Jan. 11, 1938, to A. Kegresse, discloses a "Motor Vehicle with Variable Propulsion", which includes a pair of endless tracks in association with a driving axle which is mounted on the chassis of a vehicle between the front and rear wheel axles, and drive sprockets provided on each end of the driving axle to carry the endless track. The driven axle is powered by an electric motor operated by the driver. U.S. Pat. No. 2,714,933, dated Aug. 9, 1955, to F. D. Harris, discloses an "Auxilary Endless-Tread Traction Device for Vehicles", which includes a frame suspended from the underside of a vehicle adjacent one of the vehicle driven wheels, a hydraulic system operable to cause upward and downward adjustment of the frame, and toothed rollers mounted on the frame and having a cleated traction belt mounted thereon and disposed so as to bite into the supporting surface to provide added traction for the vehicle when the frame is adjusted downwardly. A drive linkage extends from the drive wheel of the vehicle to the rollers to drive the belt. A "Wheeled Vehicle with Rotatable Endless Track" is disclosed in U.S. Pat. No. 4,204,583, dated May 27, 1980, to Hirozumi Toyoura. The wheeled vehicle of this invention includes a rotatable endless track device disposed between the front and rear wheels, a system for selectively raising and lowering the endless track device with respect to the chassis and a connecting apparatus for linking the endless track with a source of driving power when the track is lowered and brought into contact with a road surface.

One of the problems with existing motor vehicles having traction-enhancing mechanisms built therein is the complexity and accompanying susceptiblity of such mechanisms to breakdown and the expense of maintenance. In the case of dual track mechanisms, the machine is particularly expensive to maintain and operate because the design generally necessitates a complicated, heavy mechanism due to transmission of power to two heavy propelling devices, and also on account of the more sophisticated suspension requirements of the vehicle. It is known, for example, that it is very difficult to provide an efficient vehicle for an integral endless track system. Furthermore, in the case of auxiliary traction devices which are driven from a common axle, these devices must rotate at the same speed as the driven wheel. However, since the diameter of the toothed sprocket which is usually used to drive the endless track is generally smaller than that of the carrying wheel, the very appreciable relative difference in speed developed results in poor operating efficiency.

Accordingly, it is an object of this invention to provide a traction device for vehicles which is simple in construction, easy to operate and is mounted in fixed deployment under circumstances where the vehicle is positioned in a "high center" driving circumstance and requires additional traction to move.

Another object of this invention is to provide a traction device for vehicles, which in a first preferred embodiment is characterized by a rotating belt provided with spaced angle iron, angle plate or channel-shaped traction members, with the belt rotated on a pair of drums to aid vehicle traction in deeply rutted terrain.

A still further object of this invention is to provide a traction device for vehicles which, in a second preferred embodiment is characterized by rotating chains provided in spaced relationship on sprockets carried by rotating axles, the chains further provided with transversly oriented channel-shaped members, angle plates or angle iron members for aiding vehicle traction when the crown of the terrain traversed contacts the chains and channel-shaped members or angle plates due to excessively deep ruts.

Still another object of this invention is to provide a traction device for vehicles which includes a simply constructed, inexpensive device for enhancing the traction of a vehicle, which device includes an endless belt, one or more chains, or a combination of such a belt and at least one chain, rotatably mounted beneath the vehicle and carrying multiple, spaced angle plates or channel-shaped members for contacting the crown of the terrain being traversed by the vehicle, under circumstances where the ruts are excessively deep, to provide auxiliary traction for the vehicle.

A still further object of this invention is to provide a new and improved traction device for vehicles, which includes rotatably mounted angle plates or channel-shaped members provided in spaced relationship beneath a vehicle and driven by a separate source of power from the vehicle engine or wheels, which traction device is designed to contact the terrain beneath the vehicle in a "high center" situation to aid vehicle traction.

SUMMARY OF THE INVENTION

These and other objects of the invention are provided in a new and improved traction device for vehicles, which includes in a first embodiment, a rotating belt carried by a pair of drums and located beneath the vehicle with transversly-oriented angle plate members or channels attached to the belt and rotatable with the belt to provide auxiliary traction to the wheels of the vehicle in a "high center" situation. In a second preferred embodiment, the transversly oriented angle plates or channels are mounted on spaced, rotated chains carried by sprockets attached to a pair of axles beneath the vehicle and driven by a separate drive mechanism as in the case of the belt-mounted traction device, for achieving the same purpose. In yet another preferred embodiment the endless belt is mounted on one or more of the chains to provide additional support for the belt.

BRIEF DECRIPTION OF THE DRAWING

The invention will be better understood by reference to the accompanying drawings, wherein:

FIG. 1 is a perspective view, partially in section, of a preferred embodiment of a belt-mounted traction device of this invention in functional configuration on a vehicle;

FIG. 2 is a sectional view, taken along line 2—2, of the belt-mounted traction device and vehicle illustrated in FIG. 1;

FIG. 3 is an exploded view, partially in section, of a rotating drive drum and belt in the belt-mounted traction device;

FIG. 4 is a sectional view, taken along lines 4—4 in FIG. 3, of a preferred angle plate mount on the endless belt in the belt-mounted traction device;

FIG. 5 is a top elevation, partially in section, of the belt-mounted traction device illustrated in FIGS. 1-4;

DESCRIPTION OF THE PREFERRED EMBODIMENTS

Figure 6:
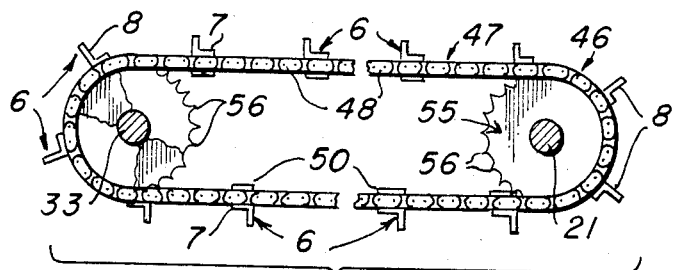
FIG. 6 is a side elevation of a preferred embodiment of a chain-mounted traction device of this invention.

Referring now to FIGS. 1-5 of the drawings in a first preferred embodiment of the invention, the belt-mounted traction device is generally illustrated by reference numeral 1. The belt-mounted traction device 1 is deployed beneath a vehicle 43 between the front tires 44 and the rear tires 45 and includes an endless belt 2, mounted on a rear drum 15 and a front drum 32, as illustrated in FIGS. 2 and 5. The rear drum 15 is secured to a drive shaft 21, which is rotatably mounted in a pair of fixed bearings 23 secured by means of bolts 31 to a rear frame member 29, as further illustrated in FIG. 5. In a preferred embodiment of the invention the drive shaft 21 is fixedly secured to the end plates 20 located on each end of the rear drum 15, by means of the welds 17 and a drive shaft sprocket 22 is mounted on the drive shaft 21 by means of an allen screw 58, extending through a shaft sprocket collar 25, which is secured to the drive shaft sprocket 22. The front drum 32 is further provided with a front shaft 33, which is rotatably mounted in a pair of adjustable bearings 36 located in bearing housings 34, which are secured to the front frame members 40. The adjustable bearings 36 are slidably positioned in the bearing housings 34 by means of an adjusting block 37, which engages an adjusting bolt 35, threadibly fitted in the nut 38. In this manner, rotation of the adjusting bolt 35 in a selected direction causes the adjustable bearings 36 to slidable move forwardly or rearwardly to tighten or loosen the tension in the endless belt 2, as hereinafter more particularly described.

Referring now to FIGS. 1, 3 and 4 of the drawings in another most preferred aspect of this embodiment of the invention, both the front drum 32 and the rear drum 15 are characterized by a curved drum surface 19, terminated by a pair of drum plates 18 on each end thereof, with the drive shaft 21 extending through the drum plates 18 of the rear drum 15 and the front shaft 33 extending through the drum plates 18 in the front drum 32, respectively. In both the rear drum 15 and the front drum 32, multiple, round drive rods 16 are provided in spaced relationship on the drum surface 19 transversely across the entire circumference of the drum surface 19 and are welded or otherwise secured to the drum surface 19. As illustrated in FIG. 1, the front drum 32 is smaller in diameter than the rear drum 15 because of space considerations. However, it will be appreciated that both the front drum 32 and the rear drum 15 may be the same size, as desired. The mount flanges 7 of multiple angle plates 6, are secured directly to the endless belt 2 by means of mount bolts 9, which are each characterized by a bolt head 10 and a bolt shank 11, and a nut 13 is tightened on each bolt shank 11 against one or more washers 12. The contact flanges 8 of the anchor plates 6 extend perpendicularly from the mount flanges 7 and serve as contact members which facilitate auxiliary traction for the vehicle 43, as hereinafter described. Alternatively, generally U-shaped channel members (not illustrated) can be used in place of the angle plates 6, as desired. Referring now to FIG. 4 of the drawings, the endless belt 2 is driven in the desired direction by contact between each drive rod 16 and the respective nuts 13, which are threaded on the bolt shanks 11 of the mount bolts 9. Accordingly, when the rear drum 15 is caused to rotate in the counter-clockwise direction as indicated by the curved arrow, the drive rods 16 successively engage the respective nuts 13 and cause the endless belt 2 to move in the direction of the top arrow. As illustrated in FIG. 3 of the drawing, the endless belt 2 is characterized by belt edges 3, defining the width of the endless belt 2 and a top surface 4, to which the mount flanges 7 of the angle plate 6 are attached. The angle plates 6 are in turn transversly positioned on the endless belt 2, with the edges of the mount flanges 7 and the contact flanges 8 substantially coterminous with the belt edges 3, as illustrated. The bottom surface 5 of the endless belt 2 faces toward the rear drum 15 and the front drum 32 and receives the washer or washers 12 as the nuts 13 are tightened on the bolt shanks 11 of the respective mount bolts 9. Referring again to FIGS. 1, 2 and 5 of the drawings, in another most preferred embodiment of the invention a drive chain 24 is positioned in engagement with the drive shaft sprocket 22 and extends through a slot (not illustrated) in a floor panel in the vehicle 43, and the opposite end of the drive chain 24 engages a winch sprocket 27, rotatably carried by the winch shaft 30 of an electric winch 26, which is positioned inside the vehicle 43. It will be appreciated by those skilled in the art that the electric winch 26 can be attached in direct drive to the winch sprocket 27, or by means of a suitable clutch mechanism, the design and operation of which is well known to those skilled in the art. Accordingly, it will be further appreciated that operation of the electric winch 26 in one direction causes the drive chain 24 to rotate the drive shaft 21 and the rear drum 15 in the same direction, to cause rotation of the endless belt 2 in that direction. Reversing of the direction of rotation of the electric winch 26 causes the endless belt 2 to rotate in the opposite direction. The electric winch 26 is mounted on a winch mount plate 28, secured to a frame member of the vehicle 43.

Referring again to FIG. 2 of the drawings, when the vehicle 43 is traversing deep ruts 41 in soft terrain which causes the angle plates 6 to touch and penetrate the crown 42 of the terrain due to the weight of the vehicle 43, the front tires 44 and rear tires 45 begin to lose traction and the vehicle 43 is in a "high center" condition. Under these circumstances, the electric winch 26 can be activated to drive the endless belt 2 either in the clockwise or in the counter-clockwise direction and cause the contact flanges 8 in the angle plates 6 to successively horizontally engage the crown 42 and provide auxiliary traction for the vehicle 43.

Figure 8:
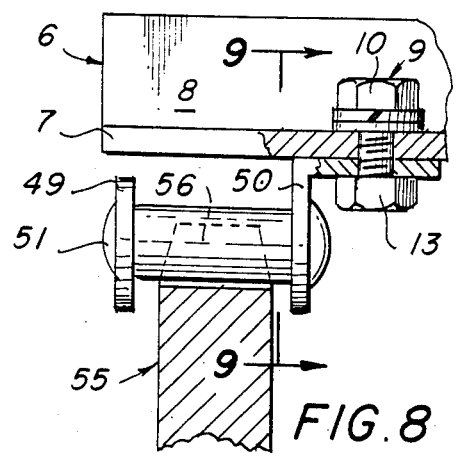
FIG. 8 is a front sectional view, taken along lines 8—8 in FIG. 7, more particularly illustrating a preferred sprocket and chain combination of the chain-mounted traction device embodiment of this invention.
Figure 7:
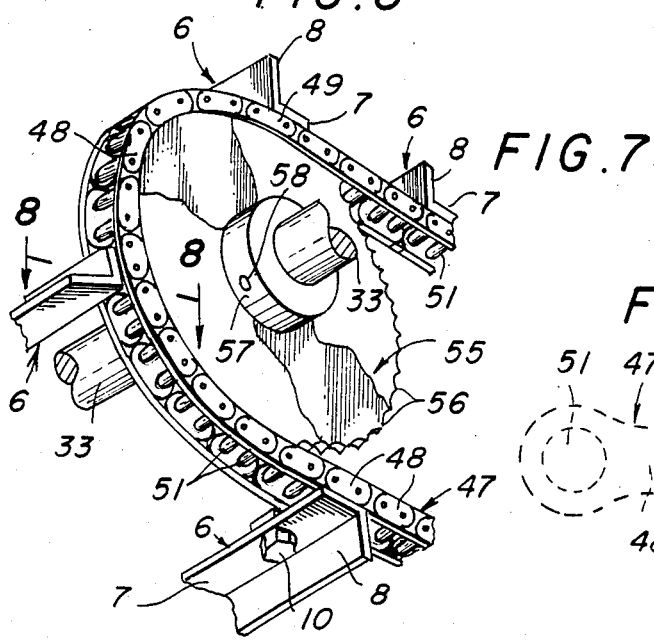
FIG. 7 is a perspective view, partially in section, of the sprockets and chain drive mechanism of the chain-mounted traction device illustrated in FIG. 6.
Figure 9:
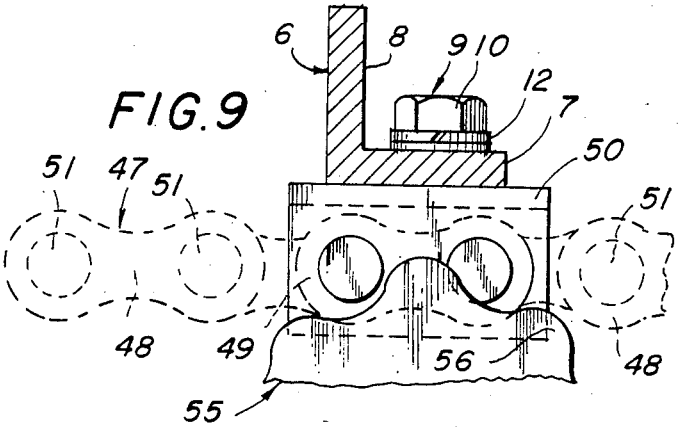
FIG. 9 is a sectional view, taken along lines 9—9 in FIG. 8, more particularly illustrating cooperation between the chain and sprocket illustrated in FIG. 8.
Figure 10:
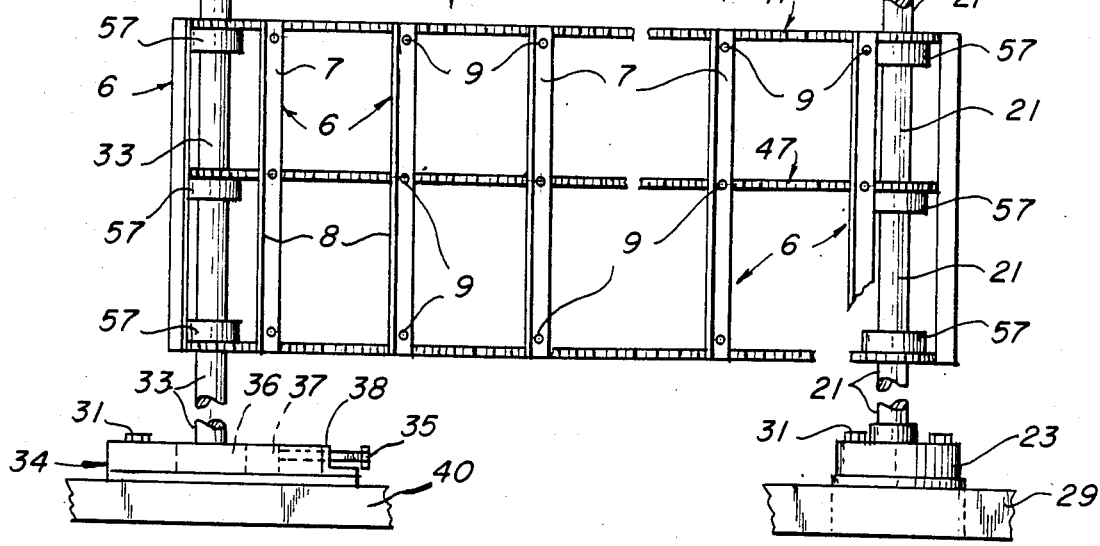
FIG. 10 is a top view of the chain-mounted traction device illustrated in FIGS. 6-9.

Referring now to FIGS. 6–10 of the drawings, in another most preferred embodiment of the invention a chain-mounted traction device is generally illustrated by reference numeral 46 and is characterized by three support chains 47, mounted in parallel relationship with respect to each other on six chain sprockets 55. Three of the chain sprockets 55 are secured in spaced relationship to the front shaft 33, while the remaining three chain sprockets 55 are spaced on the drive shaft 21, as illustrated in FIGS. 6, 7 and 10. In a most preferred embodiment of this aspect of the invention, each of the chain sprockets 55 are characterized by a sprocket collar 57, which is tightened on the drive shaft 21 and the front shaft 33, respectively, by means of an allen screw 58. The chain sprockets 55 are further provided with sprocket teeth 56 for meshing with the support chains 47, respectively, in order to drive the support chains 47 in either the clockwise or counter-clockwise direction, as hereinafter described. The support chains 47 further include chain links 48, connected by chain rollers 51, as illustrated in FIGS. 7, 8 and 9. The support chains 47 also carry the mount flanges 7 of the angle plates 6 at spaced intervals by application of angle plate brackets 50, attached to selected bracket links 49, as illustrated in FIGS. 8 and 9. Accordingly, rotation of the support chains 47 by torque applied to the drive shaft sprocket 22 and the drive chain 24 by the electric winch 26, (illustrated in FIGS. 1 and 2) causes a corresponding movement in the angle plates 6, as in the case of the angle plates 6 mounted on the endless belt 2 illustrated in FIGS. 1–5.

In operation, and referring again to FIGS. 1–5 of the drawings, under circumstances where the vehicle 43 is traversing ruts 41 which are sufficiently deep to cause the mount flanges 7 of the angle plates 6 to penetrate the crown 42 of the terrain being traversed, the front tires 44 and/or rear tires 45 may sometimes lose traction. If the vehicle 43 is characterized as a two-wheel drive vehicle, the traction of either the front tires 44 or the rear tires 45 is much less than in the case of a four wheel drive vehicle and the belt-mounted traction device 1 must sometimes be used sooner than would be necessary under circumstances where all four wheels of the vehicle are powered. In any case, under circumstances where the crown 42 contacts the angle plates 6 and either the front tires 44 or the rear tires 45 or both sets of the front tires 44 and rear tires 45 lose traction, the electric winch 26 can be activated and the endless belt 2 caused to rotate in the clockwise or counter-clockwise direction by operation of the drive chain 24. Under these circumstances, the mount flanges 7 of the angle plates 6 which are adjacent the crown 42 bite horizontally into the crown 42 and provide additional traction for the vehicle 43. This additional traction, in combination with or in lieu of the traction provided by either the front tires 44 or the rear tires 45, in the case of the two wheel drive vehicle, or both the front tires 44 and the rear tires 45, in the case of a four-wheel drive vehicle, causes the vehicle to move forwardly or rearwardly, and ultimately into an area where the ruts 41 are sufficiently shallow to reduce of the height of the crown 42 and permit the vehicle to operate without the use of the belt-mounted traction device 1. Under these circumstances, power to the electric winch 26 is terminated and rotation of the endless belt 2 stops until the crown 42 again presses against the angle plates 6 and the bottom surface 5 of the endless belt 2, where the procedure is repeated.

Referring again to FIGS. 6–10 of the drawings, the operation of the chain-mounted traction device 46 is essentially the same as that of the belt-mounted traction device 1, under circumstances where the chain-mounted traction device 46 is substituted for the belt-mounted traction device 1 illustrated in FIGS. 1–5 of the drawings. Under such circumstances, operation of the electric winch 26 causes each of the support chains 47 to rotate in the clockwise or counter-clockwise direction in concert, to rotate the angle plates 6 and cause the mount flanges 7 to bite into the crown 42 when the ruts 41 are too deep to facilitate traction by the front tires 44, the rear tires 45 or both the front tires 44 and rear tires 45. Since the drive shaft sprocket 22 forces the drive shaft 21 to rotate, each of the chain sprockets 55, which are attached to the drive shaft 21, causes the support chains 47 to rotate and move the angle plates 6 in the clockwise or counter-clockwise direction. Otherwise, in a most preferred embodiment of the invention, operation of the chain-mounted traction device 46 is the same as that of the belt-mounted traction device 1.

Referring again to FIGS. 1–5 of the drawings, it will be appreciated by those skilled in the art that drive members other than the drive rods 16 can be mounted to the drum surface 19 of the rear drum 15 in order to effect rotation of the endless belt 2 in the belt-mounted traction device 1. Accordingly, additional angle plates 6 or other members having various configurations known to those skilled in the art can be welded or otherwise supplied in spaced relationship on the drum surface 19 to effect the desired driving contact. Furthermore, an endless belt 2 having any of several compositions known to those skilled in the art can be used in the embodiment of the invention illustrated in FIGS. 1–5, although a grade 220 rubber conveyor belt material is used in a most preferred embodiment.

As heretofore noted it will also be appreciated by those skilled in the art that the connection between the electric winch 26 and the winch sprocket 27 can be made by means of a split gear or alternative sprocket or by using a clutch of suitable design, the latter of which permits the winch shaft 30 to be periodically removed from association with the winch sprocket 27, as desired. In this manner, the winch sprocket 27 can be engaged and disengaged at will in order to facilitate a more smooth transition of power to the winch sprocket 27, the drive shaft 21 and the endless belt 2 or the support chains 47.

Referring again to FIGS. 5 and 10 of the drawings, and as heretofore noted, it will be further appreciated that the slack or tension in both the endless belt 2 of the belt-mounted traction device 1 and the support chains 47 in the chain-mounted traction device 46 can be adjusted by operation of the adjusting bolts 35. Accordingly, when the adjusting bolts 35 are turned in the clockwise direction and the shanks thereof threadibly traverse the nuts 38, the adjusting blocks 37 are forced forwardly, a movement which also moves the adjustable bearings 36 forward and tightens the endless belt 2 or the support chains 47, respectively. Conversely, since the adjusting blocks 37 are attached to the adjustable bearings 36 by means well known to those skilled in the art, rotation of the adjusting bolts 35 in the counter-clockwise direction causes a rearward movement of the adjusting block 37 and the adjustable bearings 36, to reduce the tension in the endless belt 2 and the support chains 47, respectively.

Both the belt-mounted traction device 1 and the chain-mounted traction device 46 are characterized by simplicity, convenience, reliability and utility, since a single, fixedly mounted auxilary traction means is provided on a vehicle of substantially any design, which device is driven by a separate power source independent of the vehicle engine or wheels. Thus, if the vehicle engine fails, the electric winch 26 continues to operate to provide the necessary auxiliary traction. Furthermore, since in both of the basic embodiments of the invention the traction device is fixedly mounted with respect to vertical motion in a space which is less than the distance between the front tires 44 and the rear tires 45, any "high center" condition of the vehicle 43 facilitates use of the traction device and the efficiency of the traction device is increased as the pressure on the endless belt 2 or support chains 46 increases.

As heretofore described, in yet another preferred embodiment of the invention the endless belt 2 is secured to the support chains 47 by means of the mount bolts 9 and nuts 13 and both the endless belt 2 and the support chains 47 rotate to cause the angle plates 6 to engage the crown 42 of the terrain being traversed, in a high center condition of the vehicle 43. The height of the belt-mounted traction device 1, the chain-mounted traction device 46 or the combination thereof with respect to the frame of the vehicle 43 is preferably about one inch below the front and rear gear housings. However, it will be recognized that this height, as well as the relative diameters of the rear drum 15 and front drum 32, can be varied, depending upon the undercarriage design of the particular vehicle 43 to which the belt-mounted traction device 1 or chain-mounted traction device 46 is mounted.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. An auxiliary traction device for a wheeled vehicle, comprising
    (a) a pair of parallel, spaced auxiliary axles rotatably connected with the vehicle and arranged between and parallel with the axles of the vehicle;
    (b) a plurality of spaced sprockets connected for rotation with each of said auxiliary axles;
    (c) a plurality of endless chains connected with corresponding pairs of sprockets between said pair of auxiliary axles, the plane containing the lower portion of said endless chains being vertically spaced above the plane containing the lowermost portion of the vehicle wheels;

(d) a plurality of ground-engaging means extending transversely across and removably connected with said endless chains;

(e) drive means connected with one of said auxiliary axles for rotating said axle to drive said chains, said drive means including
 (1) an auxiliary motor; and
 (2) drive chain means connected between said auxiliary motor and said one axle; and (f) adjustable bearing means connecting the other of said axles with said vehicle, said adjustable bearing means being operable to vary the spacing between said pair of auxiliary axles in order to control the tension of said plurality of endless chains, whereby when the wheels of the vehicle enter a rut and said ground engaging means engage the ground adjacent the rut, said auxiliary motor is actuated to drive said one axle, thereby driving said endless chains with said ground engaging means providing additional traction to the vehicle to propel it from the rut relative to the ground.

2. Apparatus as defined in claim 1, wherein said ground engaging means comprise angle plates.

3. Apparatus as defined in claim 2, wherein said auxiliary motor comprises a winch having a winch sprocket with which said drive chain means is connected.

4. Apparatus as defined in claim 3, wherein said plurality of endless chains comprise three equally spaced chains, each chain being connected with corresponding sprockets mounted on said pair of axles.

* * * * *